United States Patent
Liu et al.

(10) Patent No.: US 10,217,221 B2
(45) Date of Patent: Feb. 26, 2019

(54) PLACE RECOGNITION ALGORITHM

(71) Applicant: INTEL CORPORATION, Santa Clara, CA (US)

(72) Inventors: Haowei Liu, Santa Clara, CA (US); Daniel Joseph Mirota, San Jose, CA (US); Samer Samir Barakat, Santa Clara, CA (US); Mohamed Selim Ben Himane, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 161 days.

(21) Appl. No.: 15/280,951

(22) Filed: Sep. 29, 2016

(65) Prior Publication Data
US 2018/0089832 A1    Mar. 29, 2018

(51) Int. Cl.
| | |
|---|---|
| *G06K 9/00* | (2006.01) |
| *G06T 7/00* | (2017.01) |
| *G06K 9/46* | (2006.01) |
| *G06K 9/62* | (2006.01) |
| *G06F 17/30* | (2006.01) |

(52) U.S. Cl.
CPC ...... *G06T 7/0042* (2013.01); *G06F 17/30253* (2013.01); *G06F 17/30256* (2013.01); *G06F 17/30259* (2013.01); *G06K 9/00664* (2013.01); *G06K 9/4642* (2013.01); *G06K 9/4676* (2013.01); *G06K 9/6255* (2013.01); *G06T 7/0048* (2013.01); *G06T 2207/20081* (2013.01); *G06T 2207/30242* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 7,870,148 B2 * | 1/2011 | Lee | G06F 17/30412 707/769 |
| 8,644,551 B2 * | 2/2014 | Hagbi | G06T 19/006 382/103 |

(Continued)

OTHER PUBLICATIONS

Galvez-Lopez et al., "Bags of binary words for fast place recognition in image sequences", IEEE Trans. Robot., vol. 28, No. 5, pp. 1188-1197, Oct. 2012.*

(Continued)

*Primary Examiner* — Feng Niu
(74) *Attorney, Agent, or Firm* — International IP Law Group, P.L.L.C.

(57) ABSTRACT

A system for place recognition is described herein. The system for place recognition comprises a plurality of sensors, a memory, and a processor. The memory is to store instructions and is communicatively coupled to the plurality of sensors. The processor is communicatively coupled to the plurality of sensors and the memory. When the processor is to execute the instructions, the processor is to detect features in a current frame and extract descriptors of the features of the current frame. The processor is also to generate a vocabulary tree using the descriptors and determine candidate key frames based on the vocabulary tree and detected features. The processor also is to perform place recognition via a first stage matching and a second stage matching.

25 Claims, 9 Drawing Sheets

(56) References Cited

U.S. PATENT DOCUMENTS

| | | | | |
|---|---|---|---|---|
| 8,724,890 | B2* | 5/2014 | Levi | G06K 9/6231 382/103 |
| 8,885,950 | B2* | 11/2014 | Nagatomo | G06K 9/6203 382/181 |
| 8,885,984 | B1* | 11/2014 | Lavi | G06K 9/4671 382/181 |
| 8,958,651 | B2* | 2/2015 | Ding | G06K 9/6211 382/154 |
| 8,971,641 | B2* | 3/2015 | Buchmueller | G06F 17/30277 348/207.1 |
| 9,053,392 | B2* | 6/2015 | Yang | G06K 9/6267 |
| 9,152,862 | B2* | 10/2015 | Ross | G06K 9/00577 |
| 9,218,391 | B2* | 12/2015 | Lee | G06F 17/30412 |
| 9,418,480 | B2* | 8/2016 | Issa | G06T 19/006 |
| 9,558,550 | B2* | 1/2017 | Klauschen | G06K 9/4642 |
| 2004/0210562 | A1* | 10/2004 | Lee | G06F 17/30412 |
| 2007/0214172 | A1 | 9/2007 | Nister et al. | |
| 2008/0301133 | A1 | 12/2008 | Brown et al. | |
| 2011/0113026 | A1* | 5/2011 | Lee | G06F 17/30412 707/722 |
| 2011/0129118 | A1* | 6/2011 | Hagbi | G06T 19/006 382/103 |
| 2012/0155778 | A1* | 6/2012 | Buchmueller | G06F 17/30277 382/209 |
| 2012/0207397 | A1* | 8/2012 | Nagatomo | G06K 9/6203 382/218 |
| 2012/0257819 | A1* | 10/2012 | Levi | G06K 9/6231 382/159 |
| 2012/0306847 | A1 | 12/2012 | Lim et al. | |
| 2014/0092132 | A1* | 4/2014 | Issa | G06T 19/006 345/633 |
| 2014/0140570 | A1* | 5/2014 | Ross | G06K 9/00577 382/100 |
| 2014/0233800 | A1* | 8/2014 | Kis | G06K 9/00744 382/103 |
| 2014/0355889 | A1* | 12/2014 | Ding | G06K 9/6211 382/209 |
| 2015/0003701 | A1* | 1/2015 | Klauschen | G06K 9/4642 382/128 |
| 2015/0161441 | A1 | 1/2015 | Robinson et al. | |
| 2015/0063713 | A1* | 3/2015 | Yang | G06K 9/6267 382/225 |
| 2015/0125049 | A1* | 5/2015 | Taigman | G06K 9/00268 382/118 |
| 2015/0262036 | A1 | 9/2015 | Song et al. | |
| 2015/0371087 | A1* | 12/2015 | Ross | G06K 9/00577 382/219 |
| 2016/0042253 | A1* | 2/2016 | Sawhney | G06K 9/6255 382/190 |
| 2016/0098460 | A1* | 4/2016 | Lee | G06F 17/30412 707/600 |
| 2016/0371634 | A1* | 12/2016 | Kumar | G06Q 10/087 |
| 2017/0186164 | A1* | 6/2017 | Seetharaman | G06K 9/00208 |

OTHER PUBLICATIONS

Pinies et al., "CI-graph SLAM for 3D reconstruction of large and complex environments using a multicamera system," Int. J. Field Robot., vol. 27, No. 5, pp. 561-586, Sep./Oct. 2010.*

Wikipedia, k-medians clustering, Sep. 6, 2015.*

PCT International Search Report, PCT Application No. PCT/US2017/048381, dated Dec. 8, 2017, 3 pages.

Galvez-Lopez et al., "Bags of Binary Words for Fast Place Recognition in Image Sequences" IEEE, date viewed Sep. 29, 2016, USA, 9 pages.

Lepetit et al., "EPnP: An Accurate O(n) Solution to the PnP Problem" Springer Science+Business Media, LLC, 2008, Switzerland, 12 pages.

Lowe, David G.; "Object Recognition From Local Scale-Invariant Features" Computer Science Department, University of British Columbia, International Journal of Computer Vision, date viewed Sep. 29, 2016, Vancouver, B.C., Canada, 8 pages.

Lowe, David G.; "Distinctive Image Features From Scale-Invariant Keypoints" Computer Science Department, University of British Columbia, International Journal of Computer Vision, Jan. 2004, Vancouver, B.C., Canada, 28 pages.

Nister et al., "Scalable Recognition With a Vocabulary Tree" Center for Visualization and Virtual Environments, date viewed Sep. 29, 2016, University of Kentucky, USA, 8 pages.

Rosten et al., "Faster and Better: A Machine Learning Approach to Corner Detection" Los Alamos National Laboratory, Oct. 14, 2008, Los Alamos, New Mexico, USA, 35 pages.

Rublee et al., "Orb: An Efficient Alternative to Sift or Surf" Willow Garage, date viewed Sep. 29, 2016, Menlo Park, California, USA, 8 pages.

Zisserman et al., "Multiple View Geometry in Computer Vision" Cambridge University Press, 2003, UK, 673 pages.

Mirota, Daniel J. et al. "Multi-Modal Real-Time Camera Localization and Environment Mapping"; U.S. Appl. No. 15/081,469, filed Mar. 25, 2016.

* cited by examiner

400

500

700

PLACE RECOGNITION ALGORITHM

BACKGROUND ART

Simultaneous Localization and Mapping (SLAM) may refer to a process of determining a location of an object while simultaneously mapping the structure surrounding the object. Determining the location may include finding the position and orientation of the object. Applications such as computer vision, robotics, augmented reality, and virtual reality frequently implement SLAM techniques. The ability to recognize places previously visited can be a fundamental component of the SLAM techniques.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
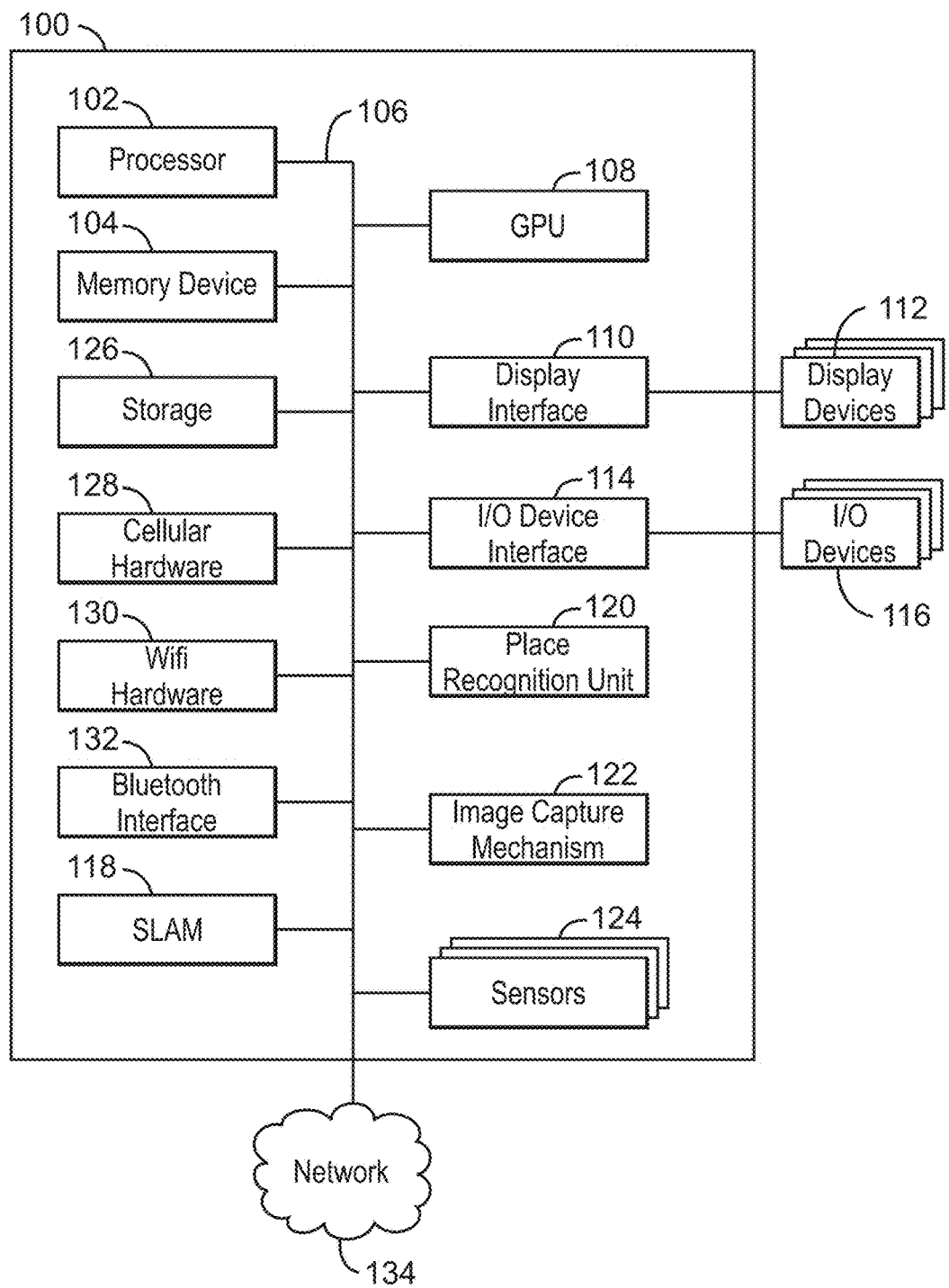
FIG. 1 is a block diagram of an exemplary system that enables a place recognition algorithm with a key frame addition strategy.

As discussed above, SLAM techniques may be used to determine a location of an object while simultaneously mapping the structure surrounding the object. SLAM can be used to determine how the object moves in an unknown environment while simultaneously building a map of the three dimensional structure surrounding the object. Accordingly, SLAM can be used to obtain camera pose and environmental structure in real time. Traditional place recognition algorithms may use sophisticated feature descriptors and brute-force feature matching, preventing real time camera pose determination. Additionally, traditional key frame adding may be based on a distance-based strategy that suffers when accounting for rotation and view point changes.

Embodiments described herein enable a place recognition algorithm for SLAM. The present techniques present heuristics to extract a smaller subset of candidate key frames from a larger group of key frames. Pair-wise matching is performed on the current frame with every one of the smaller subset of key frames until the camera pose is determined. In embodiments, the matching is a two-stage process. Moreover, a key frame adding strategy solely depends on image content. The present techniques enable real time camera pose determination.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an exemplary system that enables a place recognition algorithm with a key frame addition strategy. The electronic device 100 may be, for example, a laptop computer, tablet computer, mobile phone, smart phone, or a wearable device, among others. The electronic device 100 may also be a mobile device such as a cellular phone, a smartphone, a personal digital assistant (PDA), phablet, or a tablet. The electronic device 100 may be used to receive and render media such as images and videos. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, streaming data, or the like, to be rendered or displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to one or more display devices 112. The display devices 112 can include a display screen that is a built-in component of the electronic device 100. In embodiments, the display interface 110 is coupled with the display devices 112 via any networking technology such as cellular hardware 124, Wifi hardware 126, or Bluetooth Interface 128 across the network 134. The display devices 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100. Accordingly, in embodiments, the I/O device interface 114 is coupled with the I/O devices 116 via any networking technology such as cellular hardware 128, Wifi hardware 130, or Bluetooth Interface 132 across the network 134. The I/O devices 116 can also include any I/O device that is externally connected to the electronic device 100.

The electronic device 100 also includes a SLAM unit 118. The SLAM unit is to derive and update a map of an object's environment while maintaining an accurate position and orientation of the object in the mapped environment. SLAM can be performed via a number of techniques, including but not limited to FAST SLAM, Active SLAM, and ORB SLAM. A place recognition unit 120 may be used to determine locations within a previously mapped environment that the object has visited. The determination that an object has previously visited a location can be referred to as place recognition. In embodiments, place recognition can be performed by analyzing key frames that have been stored in a key frame database in view of a current frame captured at a current location of the object. Place recognition may be performed quickly using a small subset of key frame candidates to determine if the current location as determined by the current frame has been visited previously. In embodiments, using the small subset of key frame candidates enables place recognition to be performed in real time.

An image capture mechanism 122 may be used to obtain images or frames at various points in time. A plurality of sensors 124 may also be used to capture frames. In embodiments, the image capture mechanism 122 may be a camera or an image sensor. The plurality of sensors 124 may include a depth sensor, red, green, blue (RGB) sensor, a complementary metal-oxide semiconductor (CMOS) sensor, a charge-coupled device sensor (CCD), and active pixel sensor, and the like.

The storage device 126 is a physical memory such as a hard drive, an optical drive, a flash drive, an array of drives, or any combinations thereof. The storage device 126 can store user data, such as audio files, video files, audio/video files, and picture files, among others. The storage device 126 can also store programming code such as device drivers, software applications, operating systems, and the like. The programming code stored to the storage device 126 may be executed by the CPU 102, GPU 108, or any other processors that may be included in the electronic device 100.

The CPU 102 may be linked through the bus 106 to cellular hardware 128. The cellular hardware 128 may be any cellular technology, for example, the 4G standard (International Mobile Telecommunications-Advanced (IMT-Advanced) Standard promulgated by the International Telecommunications Union—Radio communication Sector (ITU-R)). In this manner, the electronic device 100 may access any network 134 without being tethered or paired to another device, where the cellular hardware 128 enables access to the network 134.

The CPU 102 may also be linked through the bus 106 to WiFi hardware 130. The WiFi hardware 130 is hardware according to WiFi standards (standards promulgated as Institute of Electrical and Electronics Engineers' (IEEE) 802.11 standards). The WiFi hardware 130 enables the electronic device 100 to connect to the Internet using the Transmission Control Protocol and the Internet Protocol (TCP/IP). Accordingly, the electronic device 100 can enable end-to-end connectivity with the Internet by addressing, routing, transmitting, and receiving data according to the TCP/IP protocol without the use of another device. Additionally, a Bluetooth Interface 132 may be coupled to the CPU 102 through the bus 106. The Bluetooth Interface 132 is an interface according to Bluetooth networks (based on the Bluetooth standard promulgated by the Bluetooth Special Interest Group). The Bluetooth Interface 132 enables the electronic device 100 to be paired with other Bluetooth enabled devices through a personal area network (PAN). Accordingly, the network 134 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Place recognition may include obtaining a frame as input, and outputting a camera pose. The camera pose may be a combination of the position of the camera and the orientation of the camera. Camera pose estimation or camera tracking can be used to determine the six degrees of freedom (location and orientation) of the camera. In embodiments, the six degree of freedom refers to movement forward/backward, up/down, and left/right along three perpendicular axes. The six degrees of freedom are often combined with changes in orientation through rotation about three perpendicular axes, often termed pitch, yaw, and roll.

This determination is essential to applications such as Robotics, Augmented Reality (AR), and Virtual Reality (VR). Regardless of the type of sensors used for tracking, there is a necessary place recognition component in these systems. As discussed above, place recognition enables determining if the current scene/frame is one where the device has visited previously. In embodiments, place recognition can also be used to recover from tracking failures or to correct tracking drift. In embodiments, this place recognition can be referred to as re-localization or loop closing.

Figure 2:
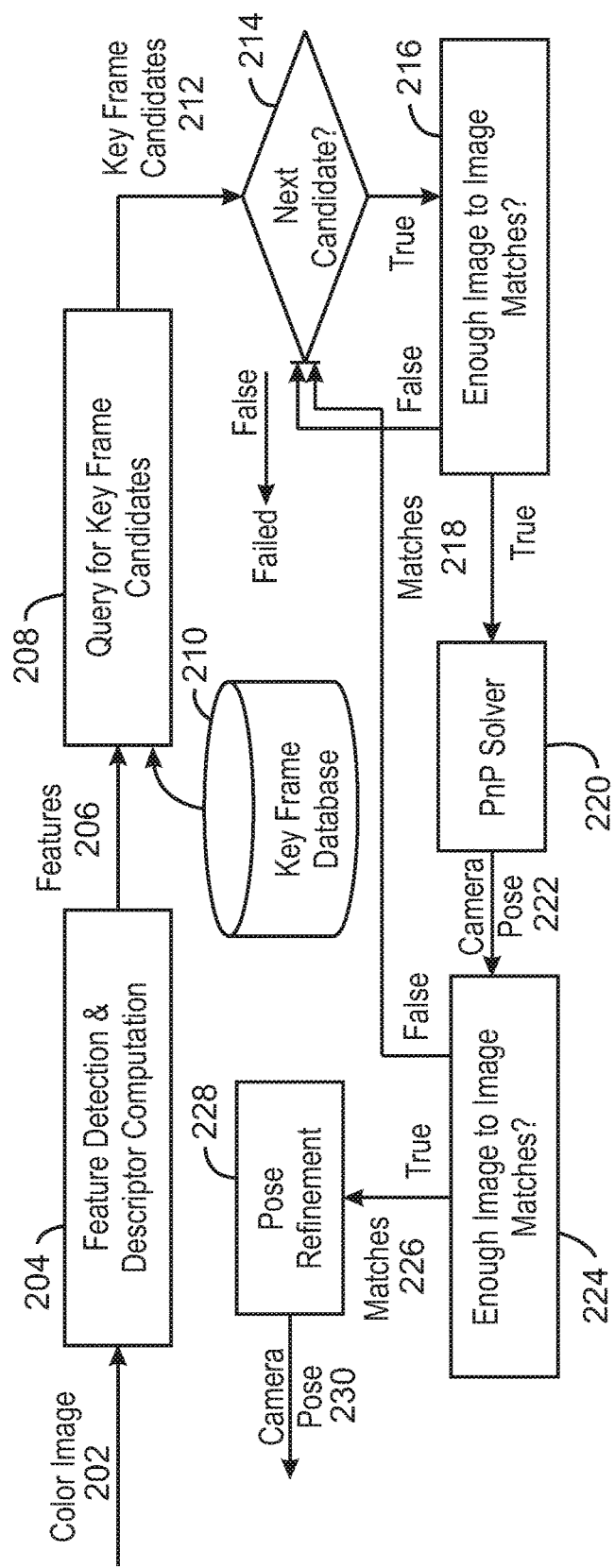
FIG. 2 is a process flow diagram of a place recognition method.

FIG. 2 is a process flow diagram of a method 200 for place recognition. The place recognition algorithm usually starts with a set of key frames. The key frames are frames where the tracker determines the location of landmarks that are present over the camera trajectory. In embodiments, a landmark is a feature that can easily be observed across several frames and that can be easily distinguished from the surrounding environment. A landmark that can easily be observed across several frames is one that can be observed from different positions. A landmark that can be easily distinguished from the surrounding environment is one that is different enough from the environment that it is not confused with other features of the environment.

The key frames usually contain features that other key frames do not cover. Given a set of key frames {Ki} with camera poses {Pi} and a current frame (I), the goal of place recognition is to determine whether the pose current frame (I) is anywhere close to a frame of the set of key frames {Ki}. If it is, place recognition should also compute the camera pose for the current frame (I) from the information that the set of key frames {Ki} contains. At block 204, a current frame (I) 202 is input to a feature detection and descriptor computation block. A plurality of features 206 are output from the feature detection and descriptor computation block 204. The features 206 are then input to block 208 to be used in a query for key frame candidates block. A plurality of key frame candidates 212 are output from the key frame candidates 208 block.

A next candidate block 214 determines if there is a next candidate in the received key frame candidates 212 that has not been analyzed with the current frame (I) 202. In this manner, matching is not performed on an entire set of key frames, such as key frames stored in the key frame database 210. Rather, matching may be limited to a smaller subset of candidate key frames from the key frame database {Ki} 210. If there is a next candidate, at block 216 it is determined if there are enough image to image matches between the present key frame candidate and the current frame (I) 202. If there is not a next candidate, the process ends. At block 216, if there are enough image to image matches between the present key frame candidate and the current frame (I) 202, the matches 218 are sent to a camera pose solver block 220. The image to image matches 218 are computing by relying on the appearance of a feature since no clues are available about the pose of the current frame. That is, to match a set of m features with another set of n features, the pair-wise matches are discovered by looking at how similar the pair of features appears, regardless of their locations on the image. If the number of matched features exceeds a pre-determined number, then the process may proceed to a camera pose solver at block 220. In embodiments, the camera pose solver 220 is a perspective-n-point (PnP) solver. If there are not enough image to image matches between the present key frame candidate and the current frame (I) 202, then process flow returns to block 214. In this manner, the present key frame candidate is discarded and a next candidate from the key frame candidates is selected for further processing.

At block 220, the camera pose solver is applied to the current frame to determine a first camera pose 222. At block 224, if there are enough image to image matches between the present key frame candidate and the current frame (I) 202 with the additional camera pose, the process flow continues to block 228. In particular, matches 226 are sent to block 228 for pose refinement. Since a rough camera pose from PnP at block 220 has been computed, when a set of m features in key frame K and another set of n features in current frame I is matched, for each m feature a rough location on frame I is computed as observed from frame I. This rough location enables a second matching process that results in matches 226. Specifically, for every one of the m features, the location information can be used to only consider those features from the set of n features that are close to the m features. The closeness of features can be determined based on a pre-determined distance between the m features and the n features. If there are not enough image-to-image matches between the present key frame candidate and the current frame (I) 202 with the additional camera pose used to provide a location estimate to determine the closeness between features, the process flow returns to block 214 and the candidate key frame is discarded. At block 228, pose refinement is performed. A final camera pose 230 is determined.

Figure 3:
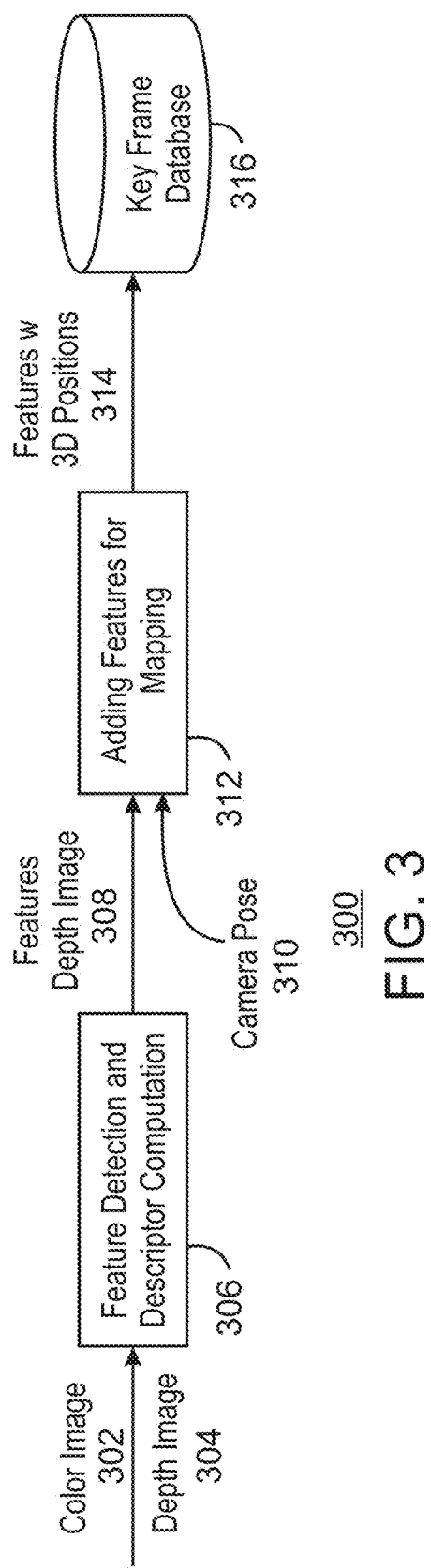
FIG. 3 is a block diagram of a key frame addition strategy.

FIG. 3 is a block diagram of a key frame addition strategy 300. A color image 302 and a depth image 304 is input to a feature detection and descriptor computation block 306. In embodiments, the depth image 306 is used to compute the degree of overlapping between the current frame and a key frame as described below. Additionally, in embodiments, the color image 302 may be used decide if a key frame should be added when no depth information is available. The features with three dimensional positions and a depth image 308 with a rough camera pose 310 is sent to a block 312, where it is determined if the current frame (I) should be added to the key frame database 316. The current frame (I) is added to the key frame database based on its closeness to other key frames as well as to satisfy an overlapping requirement as further described below.

Traditional place recognition algorithms perform pairwise feature matching between a current frame (I) and the entire set of key frames in the key frame database. If there are enough matches, the camera pose is then computed with the matching result of the current frame (I), and Kmax, which is the best matching key frame. Performing feature matching between current frame (I) and every key frame in the entire set of key frames in the key frame database may be unrealistic due to the extremely long processing time when performing feature matching on every key frame. As a result, the present techniques may implement heuristic methods to speed up the process of finding a smaller subset of candidate key frames {Ki} from a key frame database. Then, feature matching with the smaller subset of candidate key frames may be performed in real time.

In embodiments, Oriented FAST and Rotated BRIEF (ORB) binary features and a hierarchical bag-of-words model is used for feature matching between the current frame (I) and the small subset of candidate key frames {Ki}. The use of ORB binary features is distinguished from the traditionally used scale-invariant feature transform (SIFT) features. Additionally, the present techniques include a two-stage matching process as described above to improve the accuracy of matching and the computed camera pose. Moreover, the heuristics is used to select the candidates for feature matching from {Ki} based on image content. Further, an early stop strategy is used to avoid spending too much time on a bad place recognition candidate during each matching process. In embodiments, the key frame adding strategy as described in method 300 described herein depends solely on image content.

Through the use of the present techniques, feature matching runs much faster and feature matching can be performed with more key frame candidates as a result of the use of binary features. The key frame adding strategy described herein and the candidate selection are both solely based on image content. The strategy based on image content is better than the typical distance-based strategy, which does not account for rotation and view point changes. Thus, the use of image content enables the recognition of rotation and view point changes through the first feature matching process. Moreover, the early stop and two-stage matching process makes the present techniques solution efficient, reliable, and free from false positives.

As illustrated in FIGS. 2 and 3, the place recognition component handles feature matching and camera pose estimation while the key frame adding component decides when to add a key during the tracking process. A key frame should be added to the key frame database, the features are detected and added to the key frame database along with their 3D positions and current depth image.

Figure 4:
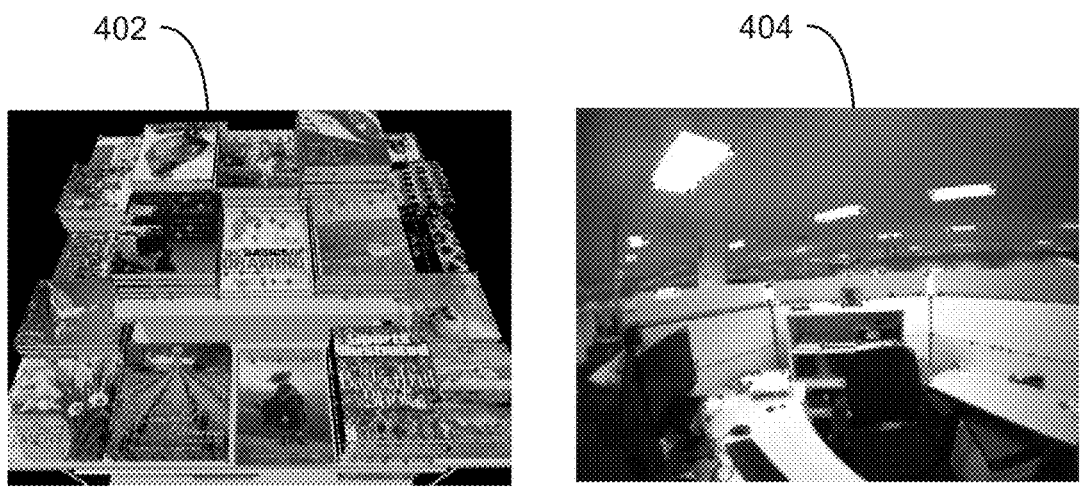
FIG. 4 is an illustration of feature detection results on images from two different video sequences.

More specifically, for feature detection and descriptor computation (block 206, FIG. 2; block 306, FIG. 3), given the current frame (I), and a set of key frames {Ki}, features from accelerated segment test (FAST) features are detected. The features may also be detected using any corner detection method. The ORB descriptors are extracted from the images over a four-level image pyramid. In embodiments, the four level image pyramid is a multi-scale signal representation of the current frame (I). A non-maximum suppression can be applied to make sure the detected features are distributed uniformly on the image. FIG. 4 is an illustration of feature detection results on images from two different video sequences. FIG. 4 includes a frame 402 and a frame 404. Each of the frame 402 and the frame 404 have a plurality of dots that indicate features found using a corner detection method. Although the feature detection and descriptor extraction component is described with respect to place recognition, this feature detection and descriptor extraction component is also used in the key frame adding procedure.

Figure 5:
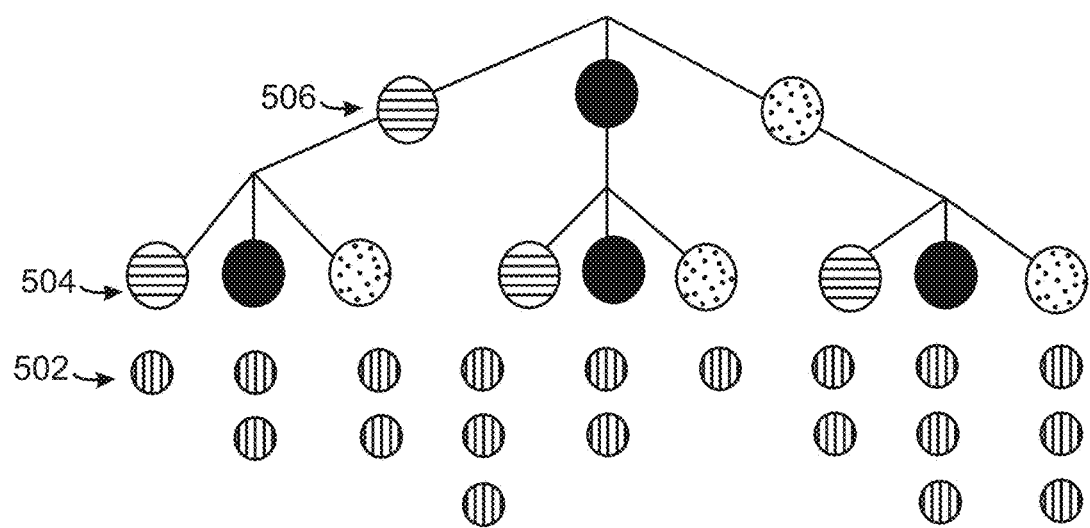
FIG. 5 is an illustration of a vocabulary tree.

To determine the image-to-image matches (block 216 and block 224, FIG. 2), a vocabulary tree may be trained offline. In embodiments, the vocabulary tree is a hierarchical K-mean tree that quantizes the descriptor space into bins of different sizes at different levels. FIG. 5 is an illustration of a vocabulary tree 500. The tree nodes represent bins of different sizes. Those on higher level are coarser and represents a larger space in the descriptor space. FIG. 5 includes three levels 502, 504, and 506. Level 502 represents the smallest bins, while level 506 represents the largest bins.

With the vocabulary tree 500 and the detected features in the current frame (I), a Bag-of-Words (BoW) vector may be computed for current frame (I) as follows. First, every feature is quantized into the bins at the finest level. In this example, the finest level is represented by the leaf nodes at level 502. A histogram is then constructed by counting the features that fall in to each finest bin. In embodiments, the BoW vector is the histogram normalized by the total number of the features. The same process is applied in the key frame adding procedure (block 312, FIG. 3).

The BoW vector can be seen as description of the image content. To retrieve the suitable candidates for place recognition, the candidates with a close BoW vector are retrieved. Closeness between the BoW vectors of two frames is defined as the inner product between two vectors. The BoW vector representation enables quick retrieval of suitable candidates without performing costly feature matching. The place recognition procedure can also be aborted much earlier if no good candidates are found, i.e. no inner products meets the closeness threshold.

Figure 6:
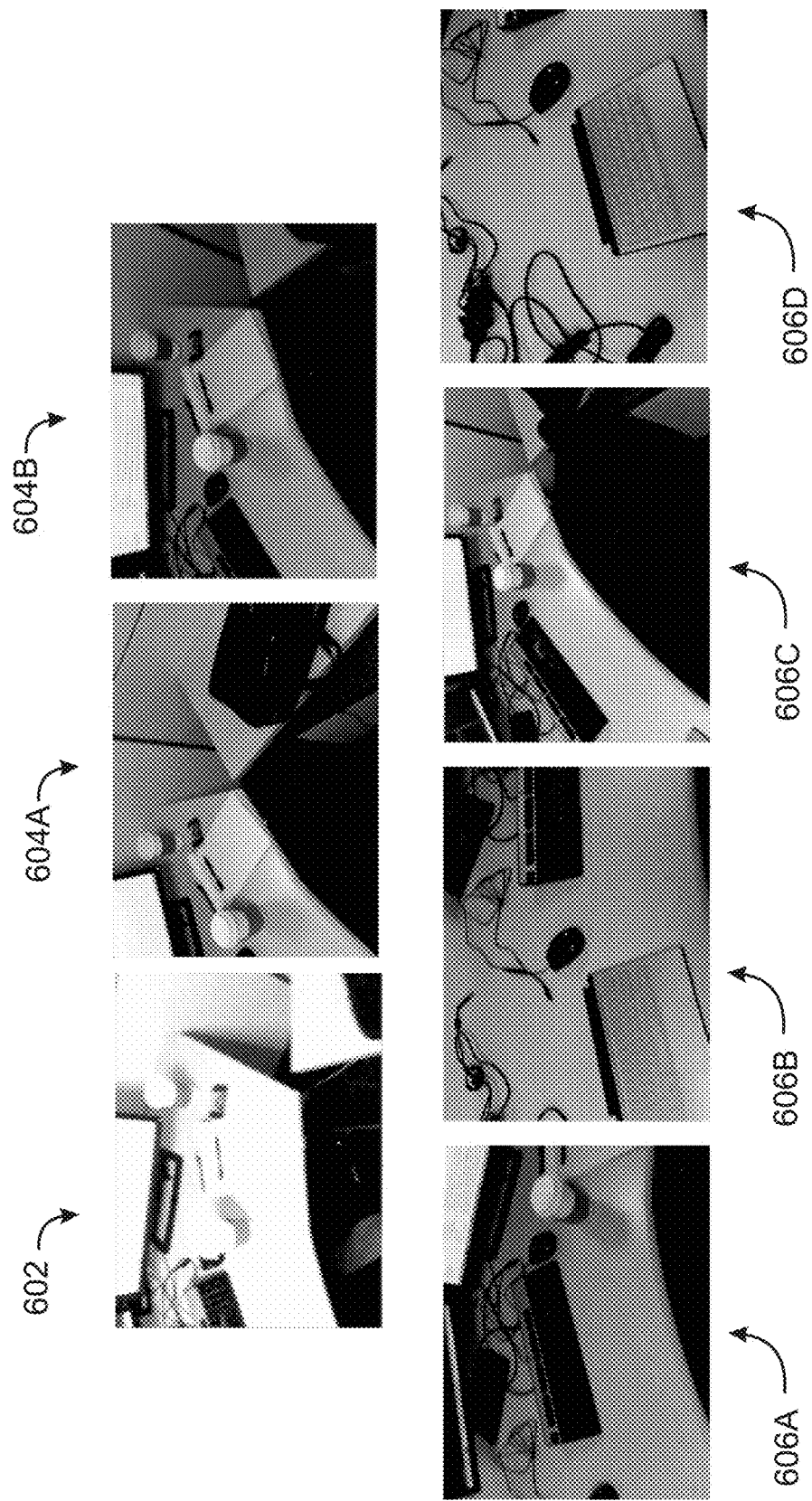
FIG. 6 shows an example of candidate retrieval.

FIG. 6 shows an example of candidate retrieval. Here, the re-localization candidate key frames 604A and 604B more or less cover the same scene as the input frame 602. The non- re-localization candidate frames 606A, 660B, 606C, and 606D are non-candidate frames. With the retrieved candidate key frames 604A and 604B, the two stage matching process is used for place recognition. In embodiments, a tight threshold on the matching descriptors are set in the first stage matching (block 216, FIG. 2) to avoid false positives and to make sure the matching results are genuine. The threshold may refer to the maximum distance allowed between a pair of matching features.

Figure 7:
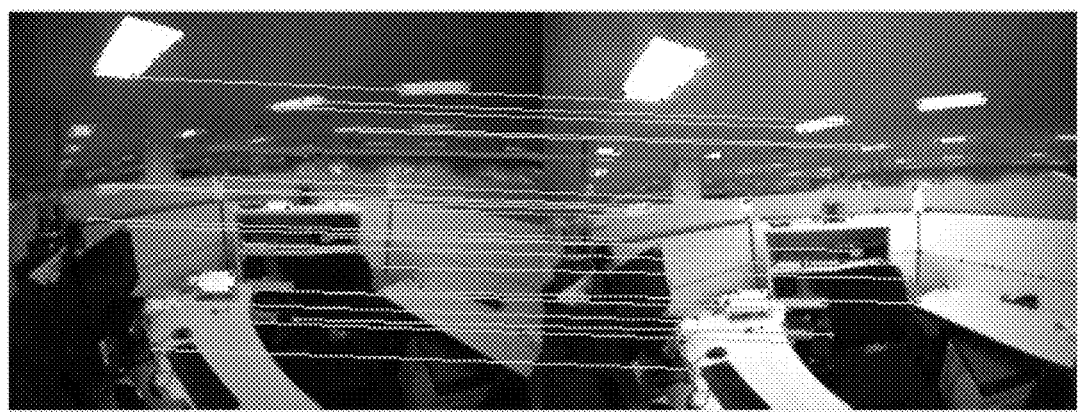
FIG. 7 is an illustration of feature matching between two frames.

In the second stage matching (block 224, FIG. 2), the threshold may be relaxed or increased, but a localized search is performed to boost up the number of correct matches. Regardless of the stage of matching, a candidate key frame that fails to meet the threshold at any given time is discarded immediately. In the first stage, for a candidate K, feature matching is performed between current frame (I) and key frame candidate (K) by matching pair-wise feature descriptors. The vocabulary tree can be used to accelerate matching and only compare features falling in the same bin two-levels up from the leaves (level 506, FIG. 5) and apply a ratio test to reject outliers. In embodiments, the ratio test includes calculating a ratio of distance from the closest neighbor to the distance of the second closest neighbor. This results in a probability that indicates the likelihood that a match is correct. If the key frame candidate K survives matching, perspective-n-point (PnP) and RANSAC may be used to solve for a camera pose. In the PnP processing, the features may be expressed as a weighted sum of four virtual control points. The coordinates of the features may be estimated in the camera referential by expressing these coordinates as weighted sum of the eigenvectors of a matrix and solving a small constant number of quadratic equations to pick the right weights. FIG. 7 is an illustration of feature matching 700 between two frames. In FIG. 7, solid lines 706 between frame 702 and 704 represent correct matching, while dashed lines 708 represent incorrect matching or outliers. The outliers may be detected via a RANSAC EPnP procedure.

Typical place recognition algorithms would stop at this point and return the camera pose. However, to refine the camera pose further, the second stage localized search is performed by projecting every feature of key frame candidate (K) onto current frame (I) and searching for the matching features in a small window around the projected image location. Additionally, the initial pose (pose 222, FIG. 2) found via PnP and RANSAC with above matching result is refined (block 228, FIG. 2) using a Levenberg-Marquardt procedure with Huber estimator if there are enough matching features.

Key frame adding according to the present techniques is based solely on image content. Traditional key frame adding strategies are based on distance. By basing the key frame adding strategy on image content, the present techniques account for rotation and view point changes. To determine if the current frame (I) should be added as a key frame to the key frame database, the BoW vector of the current frame (I) is computed and then the closest BoW vector of candidate key frame (K) is checked from the key frame database. Current frame (I) is added as key frame if the distance between their BoW vectors is large enough, indicating that the current set of key frames might not be able to cover all the scenes the tracker has traveled, as the pose of the current frame (I) exceeds a predetermined distance from any key frame in the key frame database {Ki}.

The feature detection, descriptor extraction, and BoW vector computation can be expensive if they are used to only determine if a key frame is added. If high quality depth images, e.g. depth images with high fill rate, are available, a more efficient strategy may be used by looking at an overlapping percentage between current frame (I) and every key frame {Ki}. The overlapping percentage between (I) and each key frame {Ki} may be computed using the camera poses of (I) and each key frame {Ki}. Every pixel p with depth in (I) is projected onto each key frame {Ki}. It is then determined if the projected depth is close to the observed depth for each key frame {Ki}. It is also determined if the angle between the vertex normal and the camera viewing direction are close to each other before and after the projection. To avoid false matching, the viewing directions from (I) and {Ki} with respect to the 3D position of p are required to be within a suitable range. The suitable range may be 5-10 degrees. The overlapping percentage is computed as the number of matched pixels over the number of pixels with depth. The current frame I may be added as a key frame if the largest overlapping percentage is smaller than a predefined threshold. The threshold may be determined by running several tests to select the best overlapping percentage. The best overlapping percentage enables the addition of key frames in real time.

Table 1 is a result of the present techniques and traditional place recognition algorithms applied to a dataset of 43 sequences covering synthetic data, third-party data, and test sequences. For every sequence, the exact same set of key frames is used for both algorithms. Each algorithm makes two passes of every sequence. In the first pass, the key frames are processed and added. In the second, each algorithm computes the camera pose for every frame using the set of key frames only, without tracking. Table 1 shows the quantitative comparison between traditional place recognition algorithms and the present techniques. The present techniques are better in all criteria.

techniques are initialized, the vocabulary tree may be loaded from memory. At block 808, candidate key frames are determined based on the vocabulary tree and detected features. At block 810, place recognition is performed via first stage matching and second stage matching. In embodiments, the first stage matching and second stage matching can be used to determine the final camera pose via a PnP solver. The final camera pose may be used to determine if the current location of the object is recognized.

Figure 9:
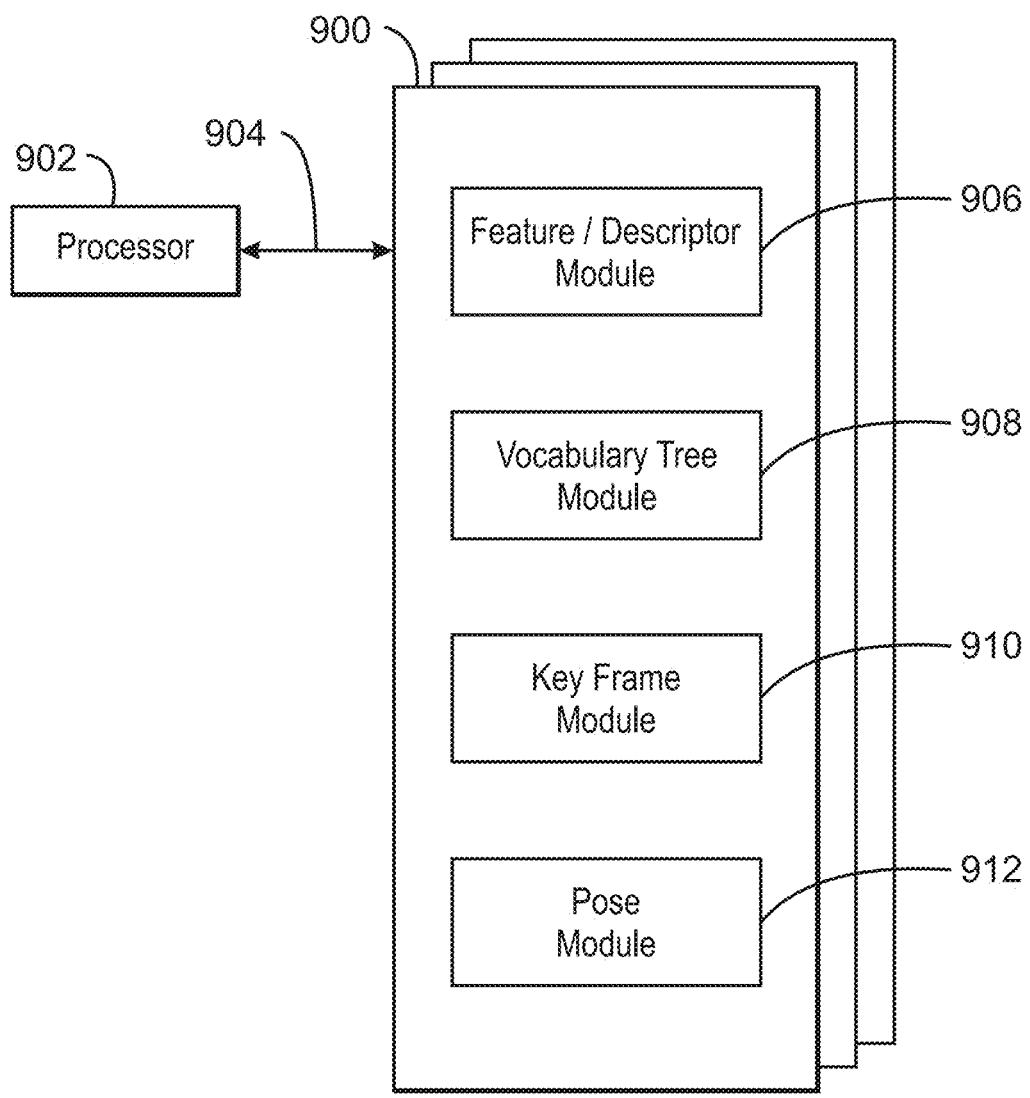
FIG. 9 is a block diagram showing media that contains logic for place recognition.

FIG. 9 is a block diagram showing media 900 that contains logic for place recognition. The media 900 may be a computer-readable medium, including a non-transitory medium that stores code that can be accessed by a processor 902 over a computer bus 904. For example, the computer-readable media 900 can be volatile or non-volatile data storage device. The media 900 can also be a logic unit, such as an Application Specific Integrated Circuit (ASIC), a Field Programmable Gate Array (FPGA), or an arrangement of logic gates implemented in one or more integrated circuits, for example.

The media 900 may include modules 906-912 configured to perform the techniques described herein. For example, a feature/descriptor module 906 may be configured to detect features in a current frame and generate descriptors. A vocabulary tree module 908 may be configured to generate vocabulary tree using the descriptors. A key frame module 910 may be configured to determine candidate frames. A pose module 912 may be configured to determine a final camera pose and thereby recognize the current location if the location has been previously visited. In some embodiments, the modules 906-912 may be modules of computer code configured to direct the operations of the processor 902.

The block diagram of FIG. 9 is not intended to indicate that the media 900 is to include all of the components shown in FIG. 9. Further, the media 900 may include any number of additional components not shown in FIG. 9, depending on the details of the specific implementation.

Example 1 is a system for place recognition. The system includes a plurality of sensors; a memory that is to store instructions and that is communicatively coupled to the plurality of sensors; and a processor communicatively coupled to the plurality of sensors and the memory, wherein when the processor is to execute the instructions, the processor is to: detect features in a current frame; extract descriptors of the features of the current frame; generate a vocabulary tree using the descriptors; determine candidate key frames from a key frame database based on the vocabu-

TABLE 1

| Technique | Inlier Ratio | Precision | Run Time | Average Error | # of Good Recognition | # of Successful Recognition | Total Frames |
|---|---|---|---|---|---|---|---|
| Previous | 72.37% | 90.45% | 43 ms | 25.6 | 36212 | 40024 | 50035 |
| Present Techniques | 76.27% | 92.05% | 8.7 ms | 23.43 | 38161 | 41458 | 50035 |

Figure 8:
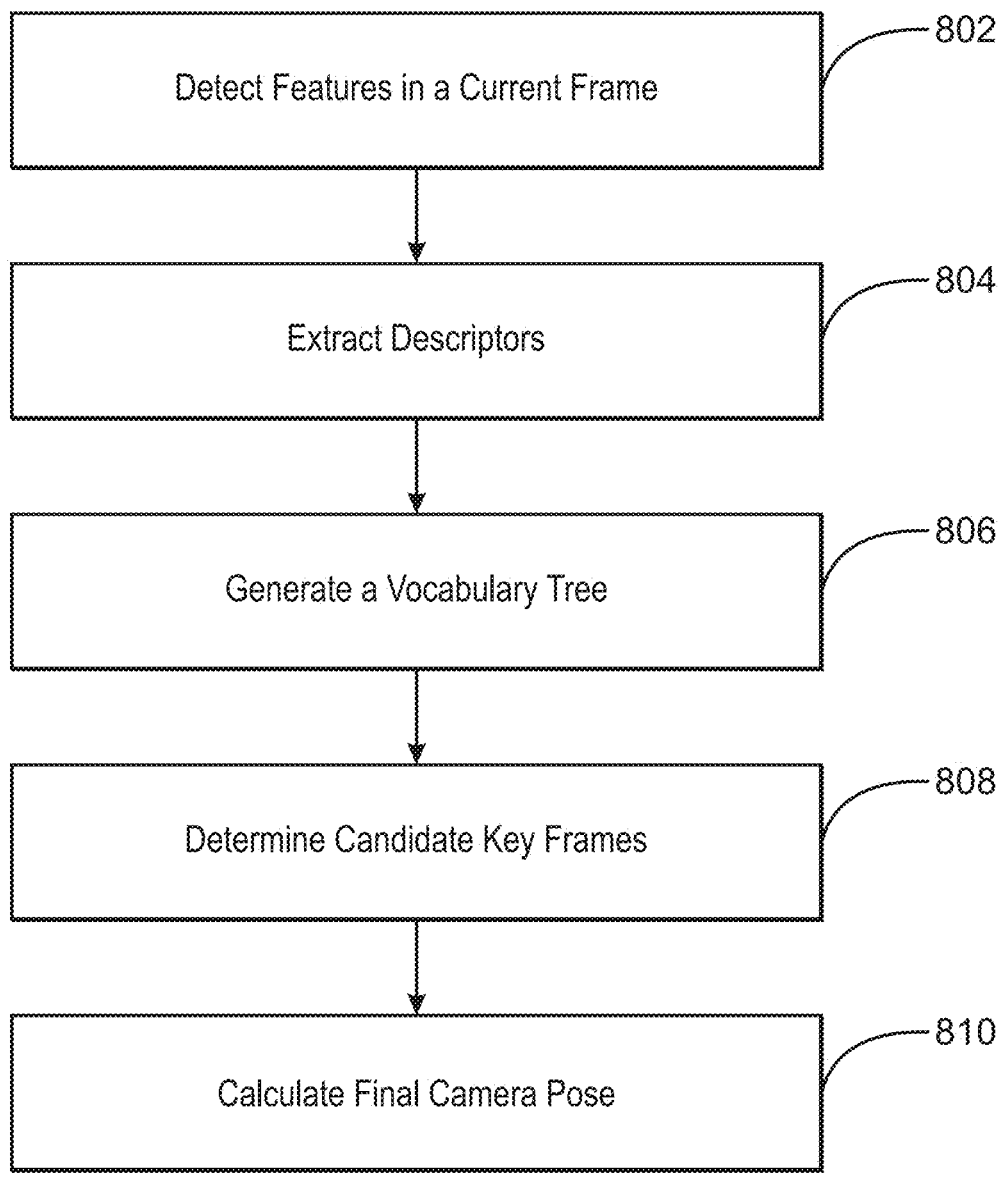
FIG. 8 is a process flow diagram of a method for place recognition.

FIG. 8 is a process flow diagram of a method 800 for place recognition. At block 802, features are detected in a current frame. At block 804, descriptors of the features of the current frame are extracted. In embodiments, the descriptors are used for both place recognition and key frame adding. At block 806, a vocabulary tree is generated using the descriptors. In embodiments, the vocabulary tree may be generated prior to any place recognition. For example, when SLAM lary tree and detected features; and perform place recognition via an image based first stage matching and a second stage matching.

Example 2 includes the system of example 1, including or excluding optional features. In this example, a bag of words vector is used to retrieve close candidate key frames from the key frame databased for the image based first stage matching.

Example 3 includes the system of any one of examples 1 to 2, including or excluding optional features. In this example, close candidate key frames are determined based on a measure of the inner product between a bag of words vector for the current frame and a bag of words vector for each frame of the candidate key frames.

Example 4 includes the system of any one of examples 1 to 3, including or excluding optional features. In this example, the system includes constructing a histogram by counting the features that fall in to each finest bin of the vocabulary tree. Optionally, a BoW vector is the histogram normalized by the total number of the features.

Example 5 includes the system of any one of examples 1 to 4, including or excluding optional features. In this example, the image based first stage matching is accelerated by comparing features falling in a same bin of the vocabulary tree, two-levels up from a leaf level of the vocabulary tree.

Example 6 includes the system of any one of examples 1 to 5, including or excluding optional features. In this example, the system includes rejecting outliers in feature matching via a ratio test.

Example 7 includes the system of any one of examples 1 to 6, including or excluding optional features. In this example, the second stage matching comprises projecting every feature of a key frame candidate onto the current frame and searching for the matching features in a small window around a projected image location.

Example 8 includes the system of any one of examples 1 to 7, including or excluding optional features. In this example, the system includes determining first camera pose via the image based first stage matching, and refining the camera pose via the second stage matching. Optionally, the camera pose from the image based first stage matching is refined using a Levenberg-Marquardt procedure with a Huber estimator.

Example 9 includes the system of any one of examples 1 to 8, including or excluding optional features. In this example, the current frame is added as a key frame based on the BoW vector of the current frame if the distance between the current frame BoW vector and the candidate frame BoW vector is above a threshold.

Example 10 includes the system of any one of examples 1 to 9, including or excluding optional features. In this example, the current frame is added as a key frame if a largest overlapping percentage of the candidate key frames and the current frame is smaller than a pre-defined threshold.

Example 11 includes the system of any one of examples 1 to 10, including or excluding optional features. In this example, the candidate key frames are discarded in the image based first stage matching and the second stage matching if the number of matches fall below a pre-determined threshold.

Example 12 is a method for place recognition. The method includes detecting features in a current frame; extracting descriptors of the features of the current frame; generating a vocabulary tree using the descriptors; determining candidate key frames based on the vocabulary tree and detected features; and performing place recognition via a first stage matching and a second stage matching.

Example 13 includes the method of example 12, including or excluding optional features. In this example, the vocabulary tree is trained prior to place recognition and quantizes the descriptor space into bins of different sizes at different levels.

Example 14 includes the method of any one of examples 12 to 13, including or excluding optional features. In this example, perspective-n-point processing is used to determine an initial camera pose, and the initial camera pose is refined based on matches from the second stage matching.

Example 15 includes the method of any one of examples 12 to 14, including or excluding optional features. In this example, a bag of words vector is used to retrieve close candidate key frames from the key frame databased for the first stage matching.

Example 16 includes the method of any one of examples 12 to 15, including or excluding optional features. In this example, method of claim 14, close candidate key frames are determined based on a measure of the inner product between a bag of words vector for the current frame and a bag of words vector for each frame of the candidate key frames.

Example 17 includes the method of any one of examples 12 to 16, including or excluding optional features. In this example, the method includes constructing a histogram by counting the features that fall in to each finest bin of the vocabulary tree, wherein the vocabulary tree is a hierarchical K-mean tree with three levels. Optionally, the first stage matching is accelerated by comparing features falling in a same bin of the vocabulary tree, two-levels up from a leaf level of the vocabulary tree.

Example 18 includes the method of any one of examples 12 to 17, including or excluding optional features. In this example, the method includes rejecting outliers in the first stage matching and the second stage matching via a ratio test.

Example 19 includes the method of any one of examples 12 to 18, including or excluding optional features. In this example, the second stage matching comprises projecting every feature of a key frame candidate onto the current frame and searching for matching features in a small window around a projected image location base on an initial camera pose.

Example 20 includes the method of any one of examples 12 to 19, including or excluding optional features. In this example, key frames are frames the location of landmarks is determine within a camera trajectory.

Example 21 is an apparatus for place recognition. The apparatus includes a database of key frames; a key frame detector to detect features in a current frame and compute descriptors of the features of the current frame; a vocabulary tree that is a hierarchical K-mean tree; a controller to determine candidate key frames from the key frame database based on the vocabulary tree and detected features; and a SLAM unit to perform place recognition via an image based first stage matching and a second stage matching.

Example 22 includes the apparatus of example 21, including or excluding optional features. In this example, a bag of words vector is used to retrieve close candidate key frames from the key frame databased for the image based first stage matching.

Example 23 includes the apparatus of any one of examples 21 to 22, including or excluding optional features. In this example, close candidate key frames are determined based on a measure of the inner product between a bag of words vector for the current frame and a bag of words vector for each frame of the candidate key frames.

Example 24 includes the apparatus of any one of examples 21 to 23, including or excluding optional features. In this example, the apparatus includes constructing a histogram by counting the features that fall in to each finest bin of the vocabulary tree. Optionally, a BoW vector is the histogram normalized by the total number of the features.

Example 25 includes the apparatus of any one of examples 21 to 24, including or excluding optional features. In this example, the image based first stage matching is accelerated by comparing features falling in a same bin of the vocabulary tree, two-levels up from a leaf level of the vocabulary tree.

Example 26 includes the apparatus of any one of examples 21 to 25, including or excluding optional features. In this example, the apparatus includes rejecting outliers in feature matching via a ratio test.

Example 27 includes the apparatus of any one of examples 21 to 26, including or excluding optional features. In this example, the second stage matching comprises projecting every feature of a key frame candidate onto the current frame and searching for the matching features in a small window around a projected image location.

Example 28 includes the apparatus of any one of examples 21 to 27, including or excluding optional features. In this example, the apparatus includes determining first camera pose via the image based first stage matching, and refining the camera pose via the second stage matching. Optionally, the camera pose from the image based first stage matching is refined using a Levenberg-Marquardt procedure with a Huber estimator.

Example 29 includes the apparatus of any one of examples 21 to 28, including or excluding optional features. In this example, the current frame is added as a key frame based on the BoW vector of the current frame if the distance between the current frame BoW vector and the candidate frame BoW vector is above a threshold.

Example 30 includes the apparatus of any one of examples 21 to 29, including or excluding optional features. In this example, the current frame is added as a key frame if a largest overlapping percentage of the candidate key frames and the current frame is smaller than a pre-defined threshold.

Example 31 includes the apparatus of any one of examples 21 to 30, including or excluding optional features. In this example, the candidate key frames are discarded in the image based first stage matching and the second stage matching if the number of matches fall below a pre-determined threshold.

Example 32 is at least one machine readable medium comprising a plurality of instructions that. The computer-readable medium includes instructions that direct the processor to detect features in a current frame; extract descriptors of the features of the current frame; generate a vocabulary tree using the descriptors; determine candidate key frames based on the vocabulary tree and detected features; and perform place recognition via a first stage matching and a second stage matching.

Example 33 includes the computer-readable medium of example 32, including or excluding optional features. In this example, the vocabulary tree is trained prior to place recognition and quantizes the descriptor space into bins of different sizes at different levels.

Example 34 includes the computer-readable medium of any one of examples 32 to 33, including or excluding optional features. In this example, perspective-n-point processing is used to determine an initial camera pose, and the initial camera pose is refined based on matches from the second stage matching.

Example 35 includes the computer-readable medium of any one of examples 32 to 34, including or excluding optional features. In this example, a bag of words vector is used to retrieve close candidate key frames from the key frame databased for the first stage matching.

Example 36 includes the computer-readable medium of any one of examples 32 to 35, including or excluding optional features. In this example, computer readable medium of claim 37, close candidate key frames are determined based on a measure of the inner product between a bag of words vector for the current frame and a bag of words vector for each frame of the candidate key frames.

Example 37 includes the computer-readable medium of any one of examples 32 to 36, including or excluding optional features. In this example, the computer-readable medium includes constructing a histogram by counting the features that fall in to each finest bin of the vocabulary tree, wherein the vocabulary tree is a hierarchical K-mean tree with three levels. Optionally, the first stage matching is accelerated by comparing features falling in a same bin of the vocabulary tree, two-levels up from a leaf level of the vocabulary tree.

Example 38 includes the computer-readable medium of any one of examples 32 to 37, including or excluding optional features. In this example, the computer-readable medium includes rejecting outliers in the first stage matching and the second stage matching via a ratio test.

Example 39 includes the computer-readable medium of any one of examples 32 to 38, including or excluding optional features. In this example, the second stage matching comprises projecting every feature of a key frame candidate onto the current frame and searching for matching features in a small window around a projected image location base on an initial camera pose.

Example 40 includes the computer-readable medium of any one of examples 32 to 39, including or excluding optional features. In this example, key frames are frames the location of landmarks is determine within a camera trajectory.

Example 41 is an apparatus for place recognition. The apparatus includes instructions that direct the processor to a database of key frames; a key frame detector to detect features in a current frame and compute descriptors of the features of the current frame; a vocabulary tree that is a hierarchical K-mean tree; a means to determine candidate key frames from the key frame database based on the vocabulary tree and detected features; and a SLAM unit to perform place recognition via an image based first stage matching and a second stage matching.

Example 42 includes the apparatus of example 41, including or excluding optional features. In this example, a bag of words vector is used to retrieve close candidate key frames from the key frame databased for the image based first stage matching.

Example 43 includes the apparatus of any one of examples 41 to 42, including or excluding optional features. In this example, close candidate key frames are determined based on a measure of the inner product between a bag of words vector for the current frame and a bag of words vector for each frame of the candidate key frames.

Example 44 includes the apparatus of any one of examples 41 to 43, including or excluding optional features. In this example, the apparatus includes constructing a histogram by counting the features that fall in to each finest bin of the vocabulary tree.

Example 45 includes the apparatus of any one of examples 41 to 44, including or excluding optional features. In this example, a BoW vector is the histogram normalized by the total number of the features.

Example 46 includes the apparatus of any one of examples 41 to 45, including or excluding optional features. In this example, the image based first stage matching is accelerated by comparing features falling in a same bin of the vocabulary tree, two-levels up from a leaf level of the vocabulary tree.

Example 47 includes the apparatus of any one of examples 41 to 46, including or excluding optional features. In this example, the apparatus includes rejecting outliers in feature matching via a ratio test.

Example 48 includes the apparatus of any one of examples 41 to 47, including or excluding optional features. In this example, the second stage matching comprises projecting every feature of a key frame candidate onto the current frame and searching for the matching features in a small window around a projected image location.

Example 49 includes the apparatus of any one of examples 41 to 48, including or excluding optional features. In this example, the apparatus includes determining first camera pose via the image based first stage matching, and refining the camera pose via the second stage matching. Optionally, the camera pose from the image based first stage matching is refined using a Levenberg-Marquardt procedure with a Huber estimator.

Example 50 includes the apparatus of any one of examples 41 to 49, including or excluding optional features. In this example, the current frame is added as a key frame based on the BoW vector of the current frame if the distance between the current frame BoW vector and the candidate frame BoW vector is above a threshold.

Example 51 includes the apparatus of any one of examples 41 to 50, including or excluding optional features. In this example, the current frame is added as a key frame if a largest overlapping percentage of the candidate key frames and the current frame is smaller than a pre-defined threshold.

Example 52 includes the apparatus of any one of examples 41 to 51, including or excluding optional features. In this example, the candidate key frames are discarded in the image based first stage matching and the second stage matching if the number of matches fall below a pre-determined threshold.

It is to be understood that specifics in the aforementioned examples may be used anywhere in one or more embodiments. For instance, all optional features of the electronic device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for place recognition, comprising:
    a plurality of sensors;
    a memory that is to store instructions and that is communicatively coupled to the plurality of sensors; and
    a processor communicatively coupled to the plurality of sensors and the memory, wherein when the processor is to execute the instructions, the processor is to:
        detect features in a current frame;
        extract descriptors of the features of the current frame;
        generate a vocabulary tree using the descriptors;
        adding the current frame to a key frame database based on the vocabulary tree and detected features, wherein the current frame is added to the key frame database if the distance between a bag-of-words vector of the current frame and a bag-of-words vector of a closest candidate key frame is large enough to indicate that the key frames databased does not cover all scenes traveled; and
        perform place recognition using key frames in view of the current frame via an image based first stage matching and a second stage matching.

2. The system of claim 1, wherein a bag of words vector is used to retrieve close candidate key frames from the key frame databased for the image based first stage matching.

3. The system of claim 1, wherein close candidate key frames are determined based on a measure of the inner product between a bag of words vector for the current frame and a bag of words vector for each frame of the candidate key frames.

4. The system of claim 1, comprising constructing a histogram by counting the features that fall in to each finest bin of the vocabulary tree.

5. The system of claim 4, wherein a BoW vector is the histogram normalized by the total number of the features.

6. The system of claim 1, wherein the image based first stage matching is accelerated by comparing features falling in a same bin of the vocabulary tree, two-levels up from a leaf level of the vocabulary tree.

7. The system of claim 1, comprising rejecting outliers in feature matching via a ratio test.

8. The system of claim 1, wherein the second stage matching comprises projecting every feature of a key frame candidate onto the current frame and searching for the matching features in a small window around a projected image location.

9. The system of claim 1, comprising determining a first camera pose via the image based first stage matching, and refining the first camera pose via the second stage matching.

10. The system of claim 9, wherein the first camera pose from the image based first stage matching is refined using a Levenberg-Marquardt procedure with a Huber estimator.

11. The system of claim 1, wherein the current frame is added as a key frame based on the BoW vector of the current frame if the distance between the current frame BoW vector and the candidate frame BoW vector is above a threshold.

12. The system of claim 1, wherein the current frame is added as a key frame if a largest overlapping percentage of the candidate key frames and the current frame is smaller than a pre-defined threshold.

13. The system of claim 1, wherein the candidate key frames are discarded in the image based first stage matching and the second stage matching if the number of matches fall below a pre-determined threshold.

14. A method for place recognition, comprising:
    detecting features in a current frame;
    extracting descriptors of the features of the current frame;
    generating a vocabulary tree using the descriptors;
    adding the current frame to a key frame database based on the vocabulary tree and detected features wherein the current frame is added to the key frame database if the distance between a bag-of-words vector of the current frame and a bag-of-words vector of a closest candidate key frame is large enough to indicate that the key frames databased does not cover all scenes traveled; and performing place recognition using key frames in view of the current frame via a first stage matching and a second stage matching.

15. The method of claim 14, wherein the vocabulary tree is trained prior to place recognition and quantizes the descriptor space into bins of different sizes at different levels.

16. The method of clam 14, wherein perspective-n-point processing is used to determine an initial camera pose, and the initial camera pose is refined based on matches from the second stage matching.

17. The method of claim 14, wherein a bag of words vector is used to retrieve close candidate key frames from the key frame databased for the first stage matching.

18. The method of claim 14, close candidate key frames are determined based on a measure of the inner product between a bag of words vector for the current frame and a bag of words vector for each frame of the candidate key frames.

19. The method of claim 14, comprising constructing a histogram by counting the features that fall in to each finest bin of the vocabulary tree, wherein the vocabulary tree is a hierarchical K-mean tree with three levels.

20. An apparatus for place recognition, comprising:
a database of key frames;
a processor to detect features in a current frame and compute descriptors of the features of the current frame;
a vocabulary tree that is a hierarchical K-mean tree;
the processor to add the current frame to the key frame database based on the vocabulary tree and detected features, wherein the current frame is added to the key frame database if the distance between a bag-of-words vector of the current frame and a bag-of-words vector of a closest candidate key frame is large enough to indicate that the key frames databased does not cover all scenes traveled; and
the processor to perform place recognition using key frames in view of the current frame via an image based first stage matching and a second stage matching.

21. The apparatus of claim 20, wherein a bag of words vector is used to retrieve close candidate key frames from the key frame database for the image based first stage matching.

22. The apparatus of claim 20, wherein close candidate key frames are determined based on a measure of the inner product between a bag of words vector for the current frame and a bag of words vector for each frame of the candidate key frames.

23. The apparatus of claim 20, comprising constructing a histogram by counting the features that fall in to each finest bin of the vocabulary tree.

24. The apparatus of claim 23, wherein a BoW vector is the histogram normalized by the total number of the features.

25. The apparatus of claim 20, wherein the image based first stage matching is accelerated by comparing features falling in a same bin of the vocabulary tree, two-levels up from a leaf level of the vocabulary tree.

* * * * *